United States Patent [19]

Rich

[11] 4,306,081
[45] Dec. 15, 1981

[54] SYMMETRICAL QUATERNARY AMMONIUM COMPOUNDS AND THEIR USE IN HEAVY METALS RECOVERY

[75] Inventor: Guy A. Rich, Chicago, Ill.

[73] Assignee: Albee Laboratories, Inc., Chicago, Ill.

[21] Appl. No.: 157,089

[22] Filed: Jun. 6, 1980

Related U.S. Application Data

[62] Division of Ser. No. 113,279, Jan. 18, 1980, Pat No. 4,289,530.

[51] Int. Cl.$^3$ ............................................. C07C 87/30
[52] U.S. Cl. .................................. 564/282; 252/421; 75/101 BE
[58] Field of Search ......................................... 564/282

[56] References Cited

U.S. PATENT DOCUMENTS

| 3,809,646 | 5/1974 | Spence | 564/282 |
| 4,128,493 | 12/1978 | MacRay et al. | 564/282 |
| 4,136,102 | 1/1979 | Crivello | 564/282 |

FOREIGN PATENT DOCUMENTS 1394181 5/1975 United Kingdom ................ 564/282

OTHER PUBLICATIONS

Masuda et al., Chem. Abst., vol. 71, #92580f (1969).

Primary Examiner—Natalie Trousof
Assistant Examiner—James H. Reamer
Attorney, Agent, or Firm—Keil & Witherspoon

[57] ABSTRACT

Symmetrical quaternary ammonium compounds of the formula

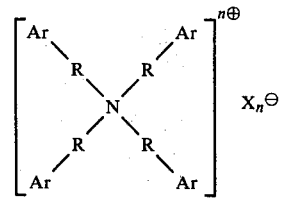

are disclosed, wherein each Ar is identical and is phenyl or a condensed polynuclear aryl group having 2 to 4 aryl nuclei, each R is identical and is alkyl of 1 to 4 carbon atoms, $X^\ominus$ is a salt-forming anion of valence 1 or 2 and n is 1 or 2 depending on the choice of X. Also disclosed are apparatus and processes for the recovery of heavy metals such as silver, gold and other precious metals from solution in water. The disclosed quaternary ammonium compounds are adsorbed to a suitable substrate, preferably alumina, and the treatment water is passed therethrough. A second bed of divided metal such as aluminum is disclosed for use in series with the bed incorporating the quaternary ammonium compounds.

10 Claims, No Drawings

SYMMETRICAL QUATERNARY AMMONIUM COMPOUNDS AND THEIR USE IN HEAVY METALS RECOVERY

This is a division, of application Ser. No. 113,279 filed Jan. 18, 1980.

FIELD OF THE INVENTION

My invention pertains generally to compounds, and apparatus and processes using them, which find particular use in the recovery of heavy metals from waste water and incidental use in the oxidation of toxic anions to less toxic biodegradable anions that may be discharged into effluent waters.

BACKGROUND OF THE INVENTION

Recently the interest in reducing the discharge of heavy metals into environmental waters has been spurred by rapidly rising prices for heavy metals, in particular gold and silver. Most industries that use large quantities of heavy metals, such as silver in the photographic industry, recycle used materials and attempt to recover as much metal as possible from waste waters generated during processes using those metals, such as photographic development.

Previous processes for the recovery of silver from exposed photographic film and from waste water from photographic development have suffered from limited silver extraction efficiency and from their inability to cope with the large amounts of toxic thiosulfate anions or metal-complexed cations that are by-products of photographic development. My invention is directed to the solution of both of these problems.

SUMMARY OF THE INVENTION

I have invented a new class of quaternary ammonium compounds of the formula

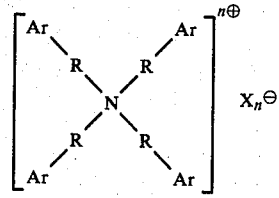

wherein each Ar is identical and is phenyl or a condensed polynuclear aryl group having 2 to 4 aryl nuclei, each R is identical and is alkyl of 1 to 4 carbon atoms, $X^{\ominus}$ is a salt-forming anion of valence 1 or 2 and n is 1 or 2 depending on the choice of X. While Ar is preferably naphthyl or phenanthryl, of any isomeric configuration, Ar may also be phenyl or other condensed polynuclear Ar groups such as anthracene, naphthacene, chrysene, pyrene and triphenylene. Larger Ar nuclei are difficult to handle in the Friedel-Crafts reactions employed to make these compounds and produce compounds with limited stability.

Each R is identical and is preferably ethyl or butyl. It is necessary, I have found, that at least one aliphatic carbon atom separate each polynuclear Ar group from the central nitrogen atom of the ammonium ion. X may be any chemically stable salt-forming anion, but it is preferably halogen, in particular chlorine. The sulfate ion is also acceptable.

My invention also comprehends apparatus for removing heavy metals from solution in water and processes for using the compounds and apparatus I have invented in the recovery of heavy metals in aqueous solution. The heavy metals include but are not limited to silver, gold, the members of the platinum family, cadmium, zinc, lead, palladium, rhodium and other transition metals. Iron is the least electronegative metal which may be recovered from solution using my invention.

The apparatus according to my invention may include a single bed or two beds connected in series. The first bed through which metal-containing water is passed comprises a suitable adsorbing substrate and an effective amount of a quaternary ammonium compound of the formula

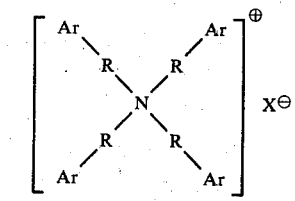

wherein each Ar is identical and is phenyl or a condensed polynuclear radical having 2 to 4 aryl nuclei, each R is identical and is alkyl of 1 to 4 carbon atoms and X is halogen, deposited on said substrate. Any of the compounds described above may be deposited on the substrate in the first bed, but I have found that as the number of Ar nuclei rises in the quaternary ammonium compound, the substrate adsorbs those molecules in preference to molecules having less bulky groups. The substrate may be any suitable material that will adsorb the quaternary ammonium compounds according to my invention, and may be constructed of such materials as silica, thallium oxide, magnesium silicate, diatomaceous earth and activated charcoal, but I have found that the preferable substrate consists essentially of a suitable aluminum oxide. This aluminum oxide, which in commercial form is sold as "alumina," may not be in the α-form, since without OH groups in the crystalline lattice, the aluminum oxide will not provide a substrate to which quaternary ammonium compounds according to my invention will adsorb. Gamma-alumina is preferred.

In the form of my invention in which the apparatus comprises two beds, the second bed consists essentially of a suitably reactive metal selected from Family IA, IIA, IIIB of the Periodic Table in suitably divided form. Of course, many of the elements in those families, such as cesium, are obviously not suited to the recover of metals from water, but they are theoretically suitable if the heavy metals are in solvents with which the most active members of these families will not react. The metal in the second bed is preferably either aluminum or magnesium, most preferably aluminum, at least about 99% pure, in particle sizes ranging from about 30 to about 50 mesh and substantially free of surface oxides. This second bed may or may not, as is dictated by the needs of the installation, be used in conjunction with the more preferred embodiments of the first bed.

In addition to providing a new family of compounds, my invention has the feature of improving the quality of waste waters produced by processes using heavy metals, in particular photographic development processes, by the stabilization of heavy metal anions, most particularly thiosulfate complex anions. The heavy metals are removed from the soluble state as sulfides or other such insoluble compounds and are trapped in the filter beds.

The first bed provides the unique feature that it is self-regenerating, requiring no backwashing or regenerative chemicals.

A further object of this invention is to provide a process for the removal of heavy metals from solution which is both efficient and which can be practised over long periods of time as compared with the prior art processes without the need for repair or replacement of filter elements. When the filter of the first bed is used to extract silver and such similar metals from thiosulfate waste waters produced by photographic processes, it has an active life range of from 30 to as much as 150 days, depending upon the flow rate and concentration of heavy metals.

It is yet a further feature of the invention to provide efficient new ion exchange agents for the recovery of heavy metals generally and to provide apparatus making use of these new agents.

Another feature of the invention is the provision of a second bed which improves effluent water quality by oxidizing toxic anions to less toxic biodegradable anions, while providing additional heavy metal separation when used in conjunction with the first bed.

DETAILED DESCRIPTION OF THE PREFERRED EMBODIMENTS

Before setting forth detailed instructions for practicing my invention, I will describe what I understand to be the theory by which my invention operates. I do not intend, however, to be bound by this description.

In the first bed, the anion exchange step may be represented as follows:

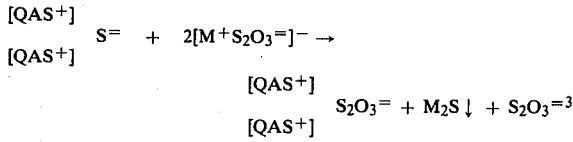

"QAS" represents quaternary ammonium salt and "M" represents a heavy metal, such as silver. While the QAS as it is adsorbed to the substrate is preferably in the form of a halide, the halide form is converted to the sulfide form above by the soluble sulfides in the water to be treated, as the sulfide form is strongly basic. It is ordinarily thought that the thiosulfate ion exists in free form in photographic development effluent waters, but I have found that the heavy metals are bound to the thiosulfate as a univalent anionic complex. The heavy metals precipitate as sulfides, falling to the bottom of the bed to be recovered later.

The QAS ion exchange agents I have invented display a unique in situ regeneration:

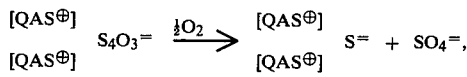

The adsorbing substrate provides sites for the oxidation of the QAS-thiosulfate form by oxygen dissolved in the treatment water. This regeneration takes place simultaneously with the anion exchange step depicted above and results in extended first bed life, of 30 to as much as 150 days, depending on flow rate and heavy metals concentration. This step also oxidizes thiosulfate anion, which degrades biologically to noxious hydrogen sulfide, to the sulfate anion, which is non-toxic and is stable towards biodegradation to hydrogen sulfide.

In the second bed, the heavy metal-thiosulfate complex not converted in the first bed is converted to the sulfide by the oxidation of the divided metal in the bed:

$$2A°+2Na[MS_2O_3]+O_2 \rightarrow Al_2O_3+M_2S \downarrow +Na_2SO_3+SO_2$$

The following is a description of the synthesis of compounds within the scope of my invention. It is understood that phenanthrene and higher condensed aryl compounds may be used in place of naphthalene.

Preparation of tetra [naphthyl-ethyl] ammonium chloride

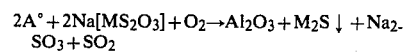

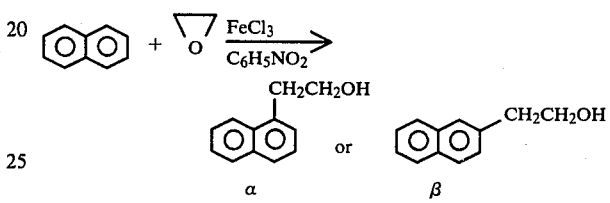

0.1 mole of anhydrous $FeCl_3$ and 0.1 mole of naphthalene, dissolved in 300 ml nitrobenzene, are introduced into a 3-neck 500 ml flask fitted with a gas dispersion tube, stirrer and thermometer and placed on an ice bath. The stopcock is opened and 0.009 moles (1.9 l at 1.1 atm) ethylene oxide are introduced into the flask with slow stirring. The reaction temperature should not exceed 30° C. as the exothermic reaction proceeds.

After 10–15 minutes a straw-colored oily suspension is obtained. At this point the flask is removed from the ice bath and 50 ml of 1.0 M aqueous HCl is added. The mixture is gently warmed to 100° C. to drive off the HCl and then is mixed with 300 ml water in a 1000 ml separatory funnel. The funnel bottoms are drawn off and allowed to stand over ice for 24 hours, as long whitish needles appear. This mixture is then filtered, the filter cake is washed with $CHCl_3$ and evaporated to dryness.

The dry crystals are added to 0.10 moles AcOCl, heated gently to drive off the HCl formed and dissolved in benzene. This solution is passed through a 15 mm. O.D.×30.5 cm column packed with Mallinckrodt Aluminar®C-110 100–200 mesh. The esters are retained in the column when the residual unreacted naphthalene is eluted with benzene. The column is then washed with 25.0 ml 1.0 M NaOH, followed by two water washes. A mixture of 2-(α)-naphthyl ethanol and 2-(β)-naphthyl ethanol is eluted from the column with 100 ml hot xylene and recrystallized therefrom. No attempt was made to separate the isomers. The crystals produced weighed 11.34 g, yield 88% of theory, and melted in the range 64°–68° C.

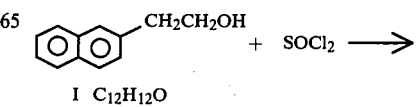

I $C_{12}H_{12}O$

-continued

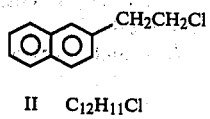

II  $C_{12}H_{11}Cl$ 10 grams of 2-naphthyl ethanol I are dissolved in 200 ml benzene and transferred to a 3-neck 1000 ml boiling flask fitted with a 25 ml dropping funnel, reflux condenser and thermometer. As the flask is gently agitated on a magnetic stirrer/hotplate, the dropping funnel stopcock is opened and 5 ml $SOCl_2$ is added dropwise to the solution. The mixture is then refluxed for 2 hours.

After the mixture cools, 50 ml of 1.0 M aqueous NaOH are added. The mixture is shaken well, the bottoms discarded and the mixture is boiled down in a beaker to a volume of 50 ml. The reduced mixture is cooled over ice until the formation of white needles, which are washed with $CHCl_3$ and recrystallized. When the crystals are redissolved in 25 ml AcOCl, no apparent reaction occurs. To this mixture is added 25 ml of 0.1 M NaOH. The product is washed with 50 ml water and filtered, the filter cake is washed with $CHCl_3$ and recrystallized. The yield is 10.94 g (99% of theory) of crystals of 2-naphthyl ethyl chloride, melting point 56°–58° C.

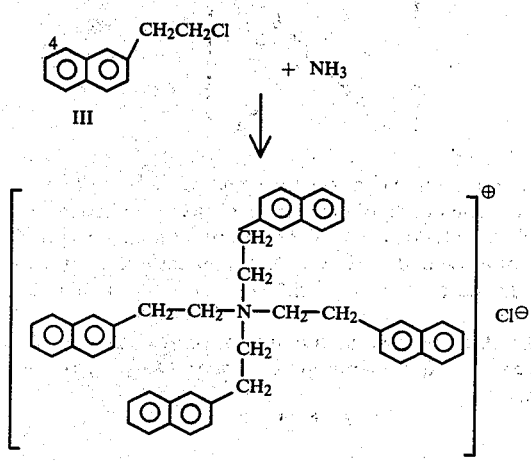

Dissolve 8 grams (0.042 moles) of III in 100 ml benzene in a 500 ml single neck boiling flask fitted with a gas dispersion tube. The flask is placed in an ice bath atop a magnetic stirrer and SLOW agitation started. Through the stopcock on the gas tube are introduced 0.01 moles (0.211 l at 1.1 atm) anhydrous ammonia. The ammonium salt immediately forms with the evolution of HCl gas. The flask is then removed from the ice bath and 100 ml of 0.01 M NaOH are added. The mixture is shaken well and heated gently to dissolve all of the salt. The mixture is filtered and cooled over ice; 5.9 grams of large white crystals are formed.

The same techniques, which are known to persons experienced in the Friedel-Crafts reaction, suffice to synthesize the other quaternary ammonium compounds which I have invented. The forms in which R is butyl, for example, can be made by using tetrahydrofuran instead of ethylene oxide. Those seeking further guidance should refer to G. Olah, *Friedel-Crafts Chemistry* (John Wiley & Sons, New York 1973). The amounts of α- and β-isomer formed depend on the solvent used for the initial reaction; nitrobenzene as the solvent yields 62% β-naphthyl isomer, but I have found that the compounds seem to work equally well regardless of what isomer is used. The choice of which Ar to use depends on the economics of the trade-off between the cost of materials and metal recovery efficiency. The cost of the aryl starting materials rises sharply as the number of condensed nuclei increases, but this is offset by the enhanced adsorption of the bulkier groups to the substrate. For the purposes of silver recovery I have found tetra [phenanthrene-ethyl] ammonium chloride to be preferable so far.

The application of the ammonium salt to the substrate involves a first step of dissolving whatever salt is to be employed in a mixture of benzyl and isopropyl alcohols, about 70% benzyl and 30% isopropyl being preferred, at about 115° C. Sufficient salt is added to make up a saturated solution, which is then poured thru a canister of conventional design packed with a catalytic grade of commercially available γ-alumina in 100–200 mesh particle sizes. Aluminas as fine as 325 mesh may be used, but they create such a pressure drop across the bed that they are not suitable for gravity flow operation, requiring instead a pump on the filter effluent line to ensure continuous flow of the water to be treated. If saturated salt solutions are used, up to 20 grams of ammonium salt can be loaded for each gram of alumina substrate material. In making up the first bed it is advantageous to achieve the heaviest salt loadings possible. I have found that virtually all of the dissolved salt will adsorb to the substrate on the first pass, with the alcohol solvent mixture running out of the bottom of the bed. After the alcohol has run out of the bed, the remaining solvent is removed by evaporation to dryness under a vacuum of 5 mm. Hg.

The second bed which is used in the process and apparatus I have invented in its more commercially suitable embodiments is simply a canister filled with granules of substantially pure aluminum or magnesium, aluminum being preferred for its lower cost and because it generates far less heat than magnesium. The aluminum may be commercially available at least 99% pure granules in particle sizes of about 30–50 mesh, substantially free of surface oxides.

In the preferred mode of operation the canisters of the first and second beds are vertically arrayed to provide gravity flow of treatment water from the input, through the first and second beds, and out the filter effluent line. The most preferred apparatus comprises the first upper bed and second lower bed separated by a multiply perforated bulkhead, with both beds placed in a single canister. The choice of single or dual canisters depends on commercial considerations and does not affect the operation of the apparatus.

The recovery of heavy metals from the beds follows conventional techniques. When the first bed becomes depleted (or earlier if desired), the bed material is removed from the canister, water is added if necessary and the material is centrifuged. The heavy metal sulfide separates out as a layer, which is removed and dried under heat until it is "bone-dry." The dried sulfide is thrown directly into a furnace and smelted for its heavy metals content. The second bed is handled in much the same way, except that the greatest portion of the divided metal substrate will be spent by conversion to its corresponding oxide.

By the same token the recovery of silver from unneeded photographic film follows conventional techniques. The film is first immersed in chloride solution to convert the silver to the chloride, and then it is washed with water. The processed film is immersed in a thiosulfate bath which leaches the silver halide from the film backing. This liquor is then passed through the apparatus in accordance with my invention.

This application sets forth preferred embodiments in accordance with the requirements of the Patent Act. It is understood that persons of ordinary skill in this art will make modifications and use equivalent compounds and apparatus without departing from the scope and spirit of my invention as disclosed herein. I intend by the following claims to cover all such modifications and equivalents.

What is claimed is:

1. A quaternary ammonium compound of the formula

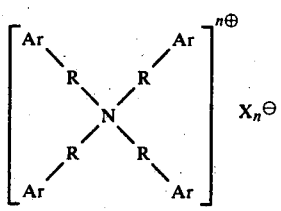

wherein each Ar is identical and is phenyl or a condensed polynuclear aryl group having 2 to 4 aryl nuclei, each R is identical and is alkyl of 1 to 4 carbon atoms, $X^\ominus$ is a salt-forming anion of valence 1 or 2 and n is 1 or 2 depending on the choice of X.

2. The compound of claim 1, wherein R is ethyl or butyl.

3. The compound of claim 1 or 2, wherein Ar is naphthyl and R is ethyl.

4. The compound of claim 1 or 2, wherein Ar is phenanthryl and R is ethyl.

5. The compound of claim 3, wherein X is halogen and n is 1.

6. The compound of claim 4, wherein X is halogen and n is 1.

7. A quaternary ammonium compound of the formula

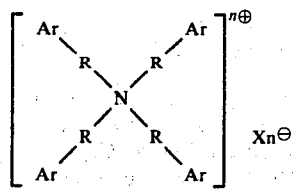

wherein each Ar is identical and is a phenyl or a condensed polynuclear aryl group having 2 to 4 aryl nuclei, each R is identical and is chosen from the group consisting of ethyl, propyl and butyl, and $X^\ominus$ is a salt forming anion of valence 1 or 2, depending on the choice of X.

8. A quaternary ammonium compound as recited in claim 7 wherein X comprises a halogen.

9. A qurternary ammonium compound of the formula

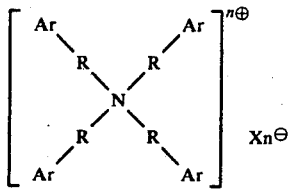

wherein each Ar is identical and is chosen from the group consisting of phenyl, naphthyl or phenanthryl, each R is identical and is chosen from the group consisting of ethyl and butyl and $X^\ominus$ is an anion chosen from the group consisting of chloride, bromide, iodide, and sulfate.

10. A quaternary ammonium compound as recited in claim 1 or claim 7 wherein $X^\ominus$, the salt forming anion is a sulfate.

* * * * *